US010358975B2

(12) United States Patent
Matsukuma et al.

(10) Patent No.: US 10,358,975 B2
(45) Date of Patent: Jul. 23, 2019

(54) COMPRESSED AIR ENERGY STORAGE AND POWER GENERATION DEVICE

(71) Applicant: Kobe Steel, Ltd., Hyogo (JP)

(72) Inventors: Masaki Matsukuma, Takasago (JP); Kanami Sakamoto, Takasago (JP); Hiroki Saruta, Takasago (JP); Masatake Toshima, Kobe (JP); Yohei Kubo, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 23 days.

(21) Appl. No.: 15/570,993

(22) PCT Filed: May 2, 2016

(86) PCT No.: PCT/JP2016/063576
§ 371 (c)(1),
(2) Date: Oct. 31, 2017

(87) PCT Pub. No.: WO2016/181883
PCT Pub. Date: Nov. 17, 2016

(65) Prior Publication Data
US 2018/0347459 A1 Dec. 6, 2018

(30) Foreign Application Priority Data
May 11, 2015 (JP) ................. 2015-096777

(51) Int. Cl.
*F02C 6/16* (2006.01)
*F04C 29/04* (2006.01)
(Continued)

(52) U.S. Cl.
CPC ............... *F02C 6/16* (2013.01); *F01D 25/14* (2013.01); *F02C 6/14* (2013.01); *F02C 7/12* (2013.01);
(Continued)

(58) Field of Classification Search
CPC ...... F02C 6/16; F02C 7/18; F02C 7/16; F02C 7/185; F02C 7/12; F02C 7/143;
(Continued)

(56) References Cited

U.S. PATENT DOCUMENTS 2,677,944 A * 5/1954 Ruff ..................... F04C 27/009
418/85
4,164,123 A * 8/1979 Smith .................... F03G 6/065
60/641.11
(Continued)

FOREIGN PATENT DOCUMENTS

CN 102953823 A 3/2013
EP 2516827 A2 10/2012
(Continued)

OTHER PUBLICATIONS

International Search Report issued in PCT/JP2016/063576; dated Jun. 28, 2016.
(Continued)

*Primary Examiner* — Hoang M Nguyen
(74) *Attorney, Agent, or Firm* — Studebaker & Brackett PC

(57) ABSTRACT

A compressed air energy storage and power generation device comprises a motor, a compressor, a pressure accumulation tank, an expander, and a generator. The motor is driven by a fluctuating input power. The compressor is mechanically connected to the motor and compresses air. The pressure accumulation tank is fluidly connected to the compressor and stores air compressed by the compressor. The expander is fluidly connected to the pressure accumulation tank and is driven by compressed air supplied from the pressure accumulation tank. The generator is mechanically connected to the expander and generates power to be supplied to a user. A cooling water flow path, whereby water flows inside a cooling water pipe for cooling air that is a
(Continued)

working fluid, is provided inside a casing of the compressor. As a result, a compressed air energy storage and power generation device can be provided that is capable of efficiently reducing compressive axial force and of reducing power consumption.

13 Claims, 5 Drawing Sheets

(51) Int. Cl.
    F02C 7/18      (2006.01)
    F02C 7/141     (2006.01)
    F01D 25/14     (2006.01)
    F02C 6/14      (2006.01)
    F02C 7/16      (2006.01)
    F02C 7/12      (2006.01)
    F02C 7/143     (2006.01)

(52) U.S. Cl.
    CPC ............ F02C 7/141 (2013.01); F02C 7/143 (2013.01); F02C 7/1435 (2013.01); F02C 7/16 (2013.01); F02C 7/18 (2013.01); F02C 7/185 (2013.01); F04C 29/04 (2013.01); F02C 7/125 (2013.01); F05D 2260/213 (2013.01); Y02E 50/12 (2013.01); Y02E 60/15 (2013.01); Y02E 70/30 (2013.01)

(58) Field of Classification Search
    CPC ........ F02C 7/1435; F02C 7/141; F02C 7/125; F02C 6/14; F04C 29/04; F01D 25/14; F05D 2260/213; Y02E 60/15; Y02E 50/12; Y02E 70/30

USPC .................. 60/659, 650, 682–684
    See application file for complete search history.

(56) References Cited

U.S. PATENT DOCUMENTS

| 4,630,436 A | 12/1986 | Frutschi |
| 4,663,939 A * | 5/1987 | Cosby .............. F02C 1/10 60/650 |
| 5,107,682 A * | 4/1992 | Cosby .............. F03G 7/10 60/650 |
| 5,263,832 A * | 11/1993 | Yamaguchi ........ F04C 29/04 418/83 |
| 2005/0039433 A1* | 2/2005 | Nakano .............. F01D 15/10 60/39.08 |
| 2012/0036853 A1 | 2/2012 | Kidd et al. |
| 2012/0102937 A1 | 5/2012 | Anikhindi et al. |
| 2013/0061591 A1 | 3/2013 | Bove et al. |
| 2014/0338318 A1 | 11/2014 | Oppenheimer |

FOREIGN PATENT DOCUMENTS

| JP | S57-206732 A | 12/1982 |
| JP | S61-182427 A | 8/1986 |
| JP | 2001-115859 A | 4/2001 |
| JP | 2012-097737 A | 5/2012 |
| JP | 2013-536357 A | 9/2013 |
| WO | 2011/076926 A2 | 6/2011 |

OTHER PUBLICATIONS

Extended European Search Report issued by the European Patent Office dated Dec. 5, 2018, which corresponds to EP16792608.8-1007 and is related to U.S. Appl. No. 15/570,993.

* cited by examiner

COMPRESSED AIR ENERGY STORAGE AND POWER GENERATION DEVICE

TECHNICAL FIELD

The present invention relates to a compressed air energy storage and power generation device.

BACKGROUND ART

The technique referred to as a compressed air energy storage (CAES) has been known as a technique to smooth or level fluctuating and unstable generated power output. The CAES technique is to, when power is excessively generated, compress air by a compressor or the like and store energy in the form of air pressure and to reconvert the energy into electricity by an air turbine generator or the like when necessary.

For example, Patent Document 1 discloses a compressed air energy storage system (compressed air energy storage and power generation device). In the compressed air energy storage system, compressed gas from which heat is recovered by a heat exchanger arranged downstream of a compressor is accumulated in a compressed gas accumulator, and the gas drawn from the accumulator is heated by the recovered heat to be supplied to a power generating device.

CITATION LIST

Patent Document

Patent Document 1: Japanese Unexamined Patent Application Publication No 2013-536357

SUMMARY OF THE INVENTION

In the configuration of Patent Document 1, the heat of the compressed gas in the compressor is recovered therefrom by a high-temperature heat exchanger and a low-temperature heat exchanger; however, in either case, only the heat of the same compressed gas is recovered. In addition, no consideration is given to the heat recovery from a heat source other than the compressed gas.

It is thus an object of the present invention to provide a compressed air energy storage and power generation device that can effectively reduce power for rotating a compressor shaft and that can reduce the total power consumption.

The present invention provides a compressed air energy storage and power generation device including: an electric motor configured to be driven by fluctuating input power; a compressor configured to be mechanically connected to the electric motor and to compress air; a pressure accumulation tank configured to be fluidly connected to the compressor and to store the air compressed by the compressor; an expander configured to be fluidly connected to the pressure accumulation tank and to be driven by the compressed air supplied from the pressure accumulation tank; a generator configured to be mechanically connected to the expander; a cooling water flow passage to which cooling water is supplied; and a first heat exchanger provided with a portion of the cooling water flow passage, which is located in a casing of the compressor, the first heat exchanger being configured to perform heat exchange to heat the cooling water in the cooling water flow passage to high temperature and cool the air as a working fluid to low temperature.

According to this configuration, power for rotating a compressor shaft can be effectively reduced in a compression step and thus the total power consumption can be reduced. Specifically, the cooling water is allowed to flow through the casing to remove heat of the compressed air in the first heat exchanger and thus the pressure rise of the air is suppressed. Therefore, compression work can be reduced and power consumption can be reduced.

The compressed air energy storage and power generation device may further include a hot water outlet mechanism from which the cooling water heated to high temperature in the cooling water flow passage is drained as hot water.

According to this configuration, the cooling water in the cooling water flow passage is heated by compression heat recovered from the compressed air in the first heat exchanger to be drained as hot water. Therefore, hot water can be provided without the need for additional power from the outside.

The compressed air energy storage and power generation device may further include: a first cooling flow passage through which a first cooling fluid for cooling the electric motor flows; and a second heat exchanger configured to perform heat exchange between the first cooling fluid heated to high temperature in the first cooling flow passage and the cooling water in the cooling water flow passage to heat the water in the cooling water flow passage to high temperature.

According to this configuration, frictional heat or the like generated in the electric motor is recovered into the first cooling fluid in the first cooling flow passage, and the cooling water in the cooling water flow passage is heated in the second heat exchanger. Therefore, a heat loss in the electric motor can be reduced and heat can be effectively utilized in the system. Also, likewise as described above, hot water can be provided without the need for additional power from the outside.

The compressed air energy storage and power generation device may further include: a second cooling flow passage through which a second cooling fluid for cooling the generator flows; and a third heat exchanger configured to perform heat exchange between the second cooling fluid heated to high temperature in the second cooling flow passage and the cooling water in the cooling water flow passage to heat the cooling water in the cooling water flow passage to high temperature.

According to this configuration, frictional heat or the like generated in the generator is recovered into the second cooling fluid in the second cooling flow passage and thereby the cooling water in the cooling water flow passage is heated in the third heat exchanger. Therefore, a heat loss in the generator can be reduced and heat can be effectively utilized in the system. Also, likewise as described above, hot water can be provided without the need for additional power from the outside.

The compressed air energy storage and power generation device may further include: a fourth heat exchanger configured to perform heat exchange between the compressed air compressed in the compressor and a heat medium to heat the heat medium to high temperature; a heat storage tank configured to store the heat medium heated to high temperature in the fourth heat exchanger; and a fifth heat exchanger configured to perform heat exchange between the heat medium supplied from the heat storage tank and the compressed air supplied from the pressure accumulation tank, heat the compressed air to high temperature, and supply the heated compressed air to the expander.

According to this configuration, heat generated in the compressor is recovered in the fourth heat exchanger and then is returned to the air in the fifth heat exchanger right before the air is expanded in the expander; thereby, charge and discharge efficiency can be increased. In a normal compressed air energy storage and power generation device, heat generated in a compressor is supplied together with compressed air into a pressure accumulation tank. Then the heat is released from the pressure accumulation tank to the atmosphere, resulting in an energy loss. In order to prevent the energy loss, the heat is recovered in advance before the compressed air is supplied to the pressure accumulation tank; therefore, the temperature of the compressed air to be stored in the pressure accumulation tank is brought close to the atmospheric temperature. Thus, the energy loss due to heat release from the pressure accumulation tank can be prevented.

The compressed air energy storage and power generation device may further include a sixth heat exchanger configured to perform heat exchange between the heat medium after heat exchange in the fifth heat exchanger and the cooling water in the cooling water flow passage to heat the water in the cooling water flow passage to high temperature.

According to this configuration, the residual heat that has not been applied in the fifth heat exchanger from the heat medium to the compressed air can be effectively utilized in the sixth heat exchanger. Also, likewise as described above, hot water can be provided without the need for additional power from the outside.

The first heat exchanger, the second heat exchanger, the third heat exchanger, and the sixth heat exchanger may be configured to be fluidly connected in series to sequentially heat the water in the cooling water flaw passage to high temperature.

According to this configuration, the water in the cooling water flow passage is sequentially heated to high temperature in the first to third and sixth heat exchangers. Therefore, low-temperature heat can be also effectively utilized.

The compressed air energy storage and power generation device may include a flow regulating means configured to regulate the flow rate of the water flowing through the cooling water flow passage, and the flow rate and the temperature of the water drained from the hot water outlet mechanism are regulated by the flow regulating means.

According to this configuration, the flow rate of the water in the cooling water flow passage can be regulated by the flow regulating means; therefore, hot water can be drained at a desired temperature and at a desired flow rate from the hot water outlet mechanism.

According to the present invention, the power for rotating a compressor shaft can be effectively reduced in the compression step of the compressed air energy storage and power generation device and power consumption can be reduced.

DESCRIPTION OF EMBODIMENTS

Hereinafter, embodiments of the present invention will be described with reference to the accompanying drawings.

[First Embodiment]

Figure 1:
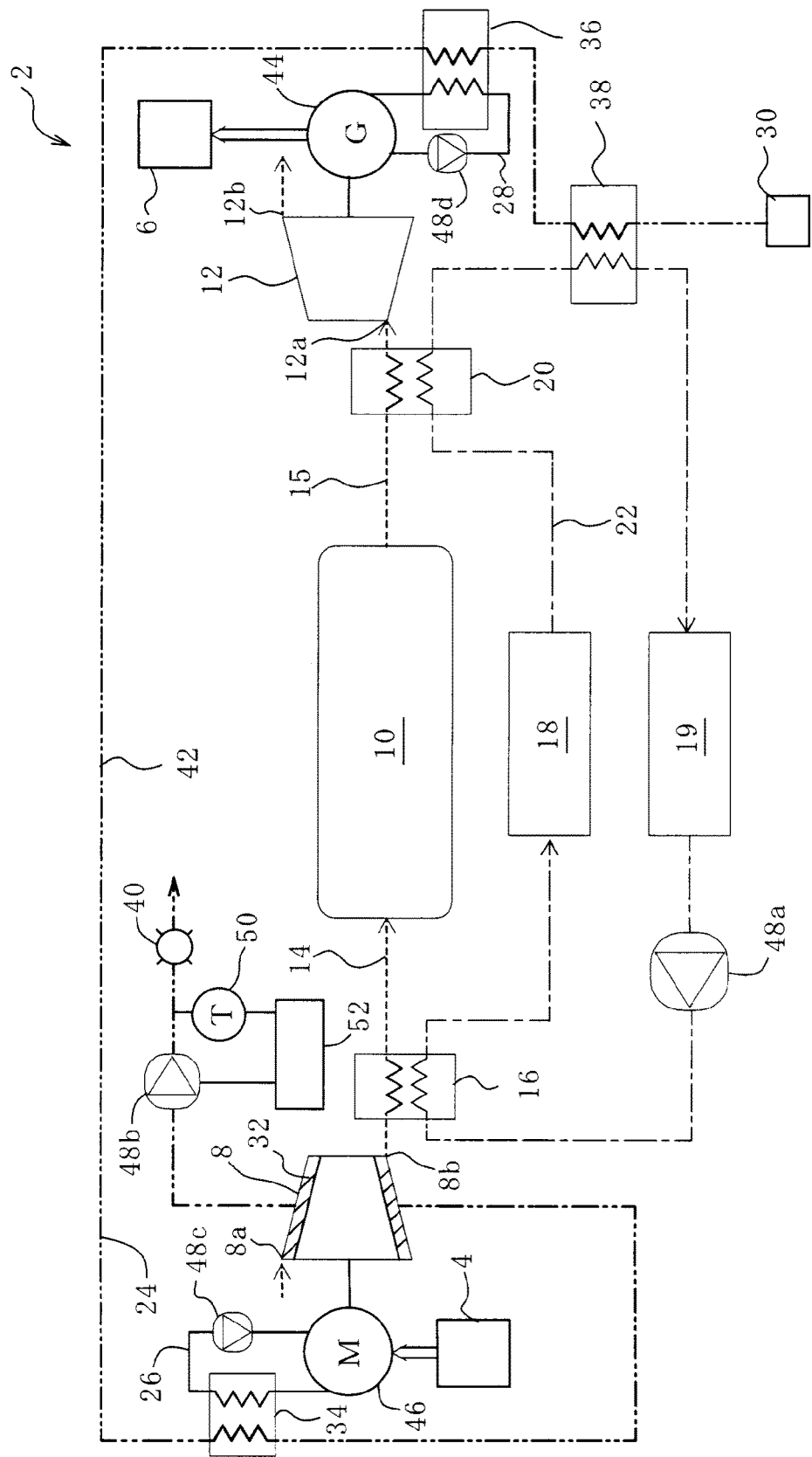
FIG. 1 is a schematic configuration diagram of a compressed air energy storage and power generation device according to a first embodiment of the present invention.

FIG. 1 is a schematic configuration diagram of a compressed air energy storage (CAES) and power generation device 2 according to a first embodiment of the present invention. In a case where a power generation facility 4 generates power by using renewable energy, the CAES power generation device 2 smooths the fluctuation of output with respect to an outside power system 6 as a supply destination and outputs power in accordance with the fluctuation of demand power in the power system 6. In addition, the power generation facility 4 is not limited to the power generation using renewable energy but may be a private power generation device such as a plant facility.

The configuration of the CAES power generation device 2 will be described with reference to FIG. 1.

The CAES power generation device 2 mainly includes four types of flow passages: an air flow passage; a heat medium flow passage, first and second cooling flow passages; and a cooling water flow passage. The air flow passage is mainly provided with a compressor 8, a pressure accumulation tank 10, and an expander 12. These are fluidly connected by air pipes 14, 15 and air flows through the air pipes 14, 15 (see short dashed lines in FIG. 1). The heat medium flow passage is mainly provided with a first air heat exchanger (fourth heat exchanger) 16, a heat storage tank 18, and a second air heat exchanger (fifth heat exchanger) 20. These are fluidly connected by a heat medium pipe 22 and a heat medium flows through the heat medium pipe 22 (see alternate long and short dash lines in FIG. 1). The first and second cooling flow passages are each a passage for simultaneously cooling a portion of components of the CAES power generation device 2 and recovering heat. The first cooling flow passage is fluidly connected by a first cooling pipe 26 and the second cooling flow passage is fluidly connected by a second cooling pipe 28. A first cooling fluid flows through the first cooling pipe 26 and a second cooling fluid flows through the second cooling pipe 28 (see solid lines in FIG. 1). The cooling water flow passage is mainly provided with a water supply device 30, first to fourth hot water heat exchangers (first to third and sixth heat exchangers) 32, 34, 36, 38, and a hot water outlet mechanism (hot water outlet) 40. These hot water heat exchangers are fluidly connected by a cooling water pipe 42, and water (hot water) flows through the cooling water pipe 42 (see alternate long and two short dashes lines in FIG. 1). Here, the air heat exchanger is a heat exchanger including air, which is a working fluid, as an object of heat exchange, and the hot water heat exchanger is a heat exchanger including water in the cooling water flow passage as an object of heat exchange.

First, the air flow passage will be described with reference to FIG. 1. In the air flow passage indicated by the short dashed lines in the drawing, the respective components are fluidly connected by the air pipes 14, 15. The suctioned air is compressed in the compressor 8 and is then stored in the pressure accumulation tank 10 and supplied to the expander 12 to be used in power generation by a generator 44.

The compressor 8 includes a motor (an electric motor) 46. The motor 46 is mechanically connected to the compressor 8. Power generated in the power generation facility 4 with renewable power is supplied to the motor 46 (see a bold line arrow in FIG. 1), thereby driving the motor 46.

The motor 46 is driven and thereby the compressor 8 is brought into operation. A discharge port 8b of the compressor 8 is fluidly connected via the first air heat exchanger 16 through the air pipe 14 to the pressure accumulation tank 10. When the compressor 8 is driven by the motor 46, the air is suctioned through a suction port 8a into the compressor 8 and is compressed therein to be discharged from the discharge port 8b; therefore, the compressed air is pumped to the pressure accumulation tank 10.

Figure 2A:
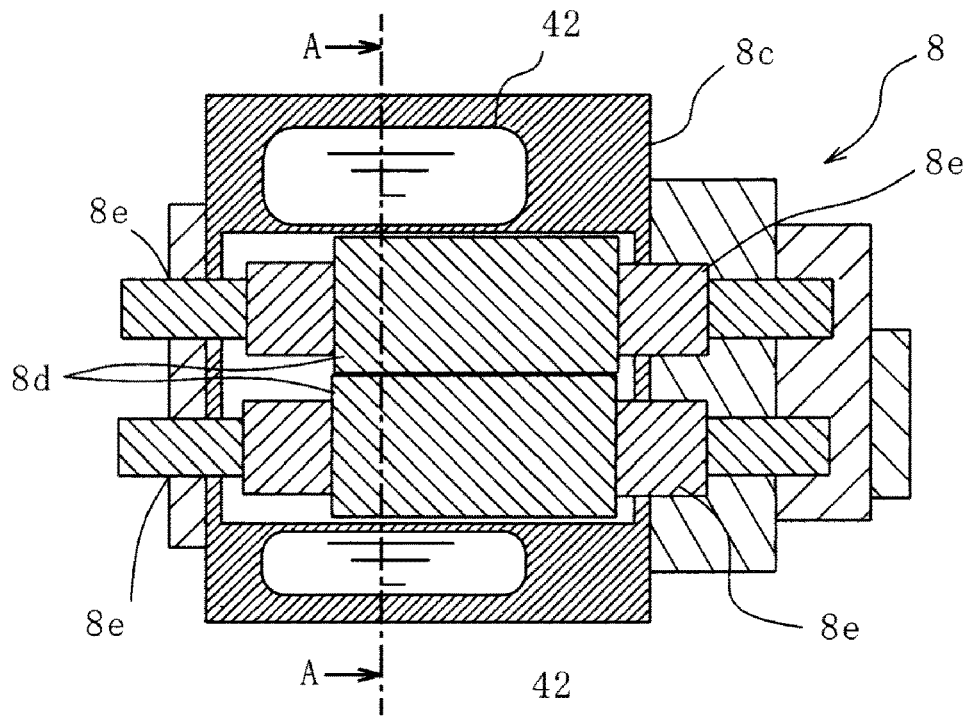
FIG. 2A is a vertical cross-sectional view schematically showing a compressor according to the first embodiment of the present invention.
Figure 2B:
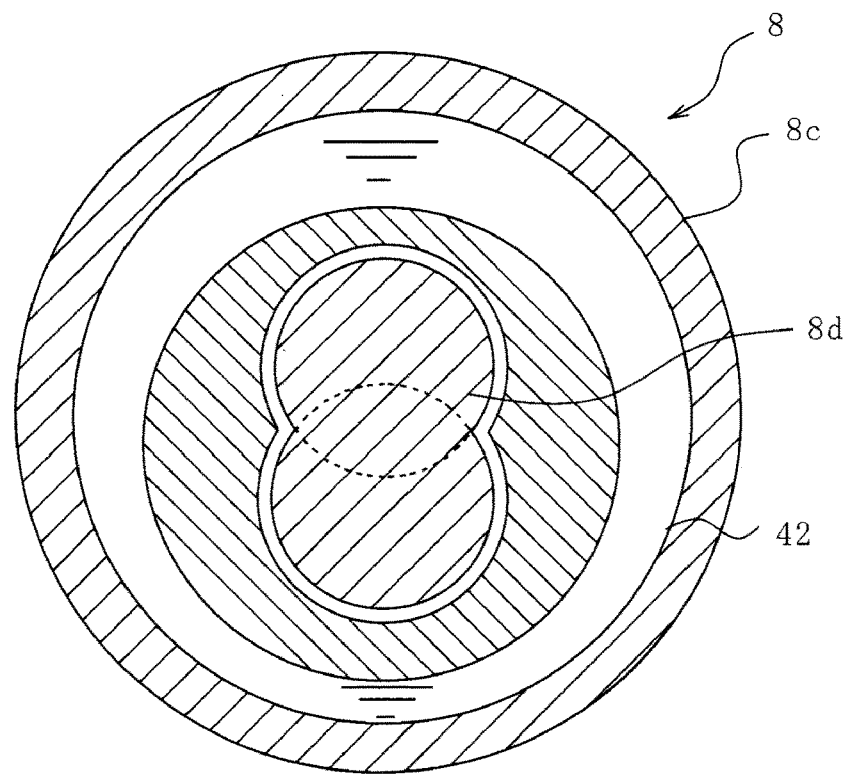
FIG. 2B is a traverse sectional view taken along the line A-A of FIG. 2A and schematically showing the compressor according to the first embodiment of the present invention.

As shown in FIG. 2A and FIG. 2B, the compressor 8 according to the present embodiment is a screw compressor and is configured such that a pair of rotors 8d is rotatably arranged in a casing 8c. A portion of the cooling water flow passage is provided in the casing 8c so as to surround the rotor 8d. As will be described below, water (cooling water) for cooling the air as the working fluid of the compressor 8 flows through the cooling water pipe 42. The cooling water flow passage in the casing 8c is configured such that the cooling water pipe 42 is provided in communication with the circumference of the rotors 8d. Alternatively, the cooling water flow passage in the casing 8c may be formed in a U-shape or may be divided into plural rows.

The cooling water flow passage is provided in the casing 8c; thereby; in a compression step, the cooling efficiency of the air as the working fluid is improved and the power for rotating a compressor shaft is reduced, and thus power consumption can be reduced. Specifically, the cooling water is allowed to flow through the casing 8c to remove heat of the compressed air and thus the pressure rise of the air is suppressed. Therefore, compression work can be reduced and power consumption can be reduced. Further, when adiabatic compression is performed in the compressor 8, the temperature of the compressed air rises and therefore the efficiency is decreased. Consequently, isothermal compression may ideally be performed; however, it is difficult to perform a rigorous isothermal compression and a polytropic change, which is intermediate between isothermal compression and adiabatic compression, may be actually made. In the present embodiment, the cooling water flow passage is provided in the casing 8c, thereby cooling the compressed air. Accordingly, the polytropic change is approximated to the isothermal change. Also, the temperature of the casing 8c is uniformly maintained. Consequently, the casing 8c is prevented from being largely distorted by a temperature difference generated due to compression heat in the compression step.

The single compressor 8 is provided in the present embodiment, but not limited thereto. Alternatively; a plurality of compressors 8 may be provided. Also, the compressor 8 is not limited to a screw compressor beat may be, for example, a turbo compressor or a scroll compressor. Preferably, an oil-free compressor may be applied as the compressor 8. In the case of the oil-free compressor 8, a temperature drop due to oil does not occur; therefore, heating temperature can be significantly increased and the generated power output per flow rate of the compressed air can be increased. Furthermore, the oil can be prevented from entering the inside of the body of the compressor 8 or the compressed air to be discharged, and the risk of contamination of downstream processes by the oil can be avoided.

The pressure accumulation tank 10 is configured to store the compressed air pumped from the compressor 8. Therefore, energy can be accumulated as the compressed air in the pressure accumulation tank 10. The pressure accumulation tank 10 is fluidly connected via the second air heat exchanger 20 through the air pipe 15 to the expander 12. The compressed air stored in the pressure accumulation tank 10 is supplied to the expander 12.

The expander 12 is provided with the generator 44. The generator 44 is mechanically connected to the expander 12. The expander 12 to which the compressed air is supplied through a suction port 12a is operated by the supplied compressed air to drive the generator 44. The generator 44 is electrically connected to the outside power system 6 (see a bold line arrow in FIG. 1) to supply the generated power to the power system 6 as the supply destination. Also, the air expanded in the expander 12 is discharged from a discharge port 12b to the outside.

The single expander 12 is provided in the present embodiment, but not limited thereto. Alternatively, a plurality of expanders 12 may be provided. Also, the expander 12 may be any kind of expander, and the expander 12 may be, for example, a screw expander, a turbo expander, or a scroll expander.

Second, the heat medium flow passage will be described with reference to FIG. 1. The heat medium flow passage indicated by the alternate long and short dash lines in the drawing is configured by the heat medium pipe 22 in a circulating manner. In the heat medium flow passage, heat generated in the compressor 8 is recovered into the heat medium in the first air heat exchanger 16 and the heat medium heated to high temperature is stored in the heat storage tank 18. In addition, the heat is returned to the compressed air in the second air heat exchanger 20 before the compressed air is expanded in the expander 12. A pump 48a is provided in the heat medium flow passage, and the heat medium in the heat medium pipe 22 is circulated by the pump 48a. The heat medium may be any kind of heat medium. For example, a heat medium such as mineral oil or a glycol based heat medium may be used.

In the first air heat exchanger 16, heat is transferred between the heat medium in the heat medium pipe 22 and the compressed air the air pipe 14 located between the compressor 8 and the pressure accumulation tank 10; thereby, compression heat generated in compression by the compressor 8 is recovered into the heat medium. In other words, in the first air heat exchanger 16, the temperature of the compressed air drops and the temperature of the heat medium rises. The heat medium heated to high temperature in the first air heat exchanger 16 is supplied through the heat medium pipe 22 to the heat storage tank 18.

The heat storage tank 18 is thermally insulated from the atmosphere and is configured to store the heat medium heated to high temperature by heat exchange in the first air heat exchanger 16. The stored heat medium is supplied through the heat medium pipe 22 to the second air heat exchanger 20.

In the second air heat exchanger 20, heat is transferred between the compressed air in the air pipe 15 located between the pressure accumulation tank 10 and the expander 12 and the heat medium in the heat medium pipe 22. Therefore, the temperature of the compressed air is raised before the air is expanded by the expander 12. In other words, in the second air heat exchanger 20, the temperature of the compressed air rises and the temperature of the heat medium drops. The heat medium cooled to low temperature in the second air heat exchanger 20 is supplied to a heat medium return tank 19 to be stored therein. The heat medium stored in the heat medium return tank 19 is supplied by the pump 48a to the first air heat exchanger 16, and thus the heat medium is circulated through the heat medium pipe 22.

As described above, heat generated in the compressor 8 is recovered and the heat is returned to the air right before the air is expanded in the expander 12; thereby, charge and discharge efficiency can be increased. In the CAES power generation device 2 where heat recovery is not performed, heat generated in the compressor is supplied together with compressed air to the pressure accumulation tank 10. Then, the heat is released from the pressure accumulation tank 10 to the atmosphere, resulting in an energy loss. In order to prevent the energy loss, the heat is recovered in advance before the compressed air is supplied to the pressure accumulation tank 10; therefore, the temperature of the compressed air to be stored in the pressure accumulation tank 10 is brought close to the atmospheric temperature. In the present embodiment, as just described, the energy loss due to heat release from the pressure accumulation tank 10 is prevented.

Third, the first and second cooling flow passages will be respectively described with reference to FIG. 1. The motor 46 is cooled in the first cooling flow passage indicated by the solid lines in the drawing and the generator 44 is cooled in the second cooling flow passage indicated by the solid lines in the drawing. Therefore, heat generated in the motor 46 and the generator 44 is recovered.

The first cooling flow passage is configured by the first cooling pipe 26 in a circulating manner and a portion of the first cooling flow passage is provided adjacent to drive portions, which are associated with the motor 46, such as bearings 8e (see FIG. 2A) or gears (not shown). An oil (the first cooling fluid) for cooling the drive portions flows through the first cooling pipe 26. The drive portions, which are associated with the motor 46, such as the bearings 8e (see FIG. 2A) or the gears (not show) are cooled by the oil in the first cooling pipe 26, and frictional heat or the like generated by the drive portions is recovered into the oil. The oil in the first cooling pipe 26 according to the present embodiment is circulated by a pump 48c, but the oil may remain in the first cooling pipe 26 when the pump 48c is not provided.

The second cooling flow passage is configured by the second cooling pipe 28 in a circulating manner and a portion of the second cooling flow passage is provided adjacent to drive portions, which are associated with the generator 44, such as bearings (not shown) or gears (not shown). An oil (the second cooling fluid) for cooling the drive portions flows through the second cooling pipe 28. The drive portions (not shown) of the generator 44 are cooled by the oil in the second cooling pipe 28, and frictional heat or the like generated by the drive portions is recovered into the oil. The oil in the second cooling pipe 28 according to the present embodiment is circulated by a pump 48d, but the oil may remain in the second cooling pipe 28 when the pump 48d is not provided.

Fourth, the cooling water flow passage will be described with reference to FIG. 1. The cooling water flow passage indicated by the alternate long and two short dashes lines in the drawing is configured by the cooling water pipe 42. One end of the cooling water flow passage is fluidly connected to the water supply device 30 and the other end of the cooling water flow passage is fluidly connected to the hot water outlet 40. Water supplied from the water supply device 30 flows through the cooling water pipe 42. The fourth hot water heat exchanger 38, the third hot water heat exchanger 36, the second hot water heat exchanger 34, and the first hot water heat exchanger 32 are provided in the mentioned order from the upstream side to the downstream side in the cooling water pipe 42. The water supplied from the water supply device 30 into the cooling water pipe 42 is sequentially heated to high temperature by heat exchange in the fourth to first hot water heat exchangers 38, 36, 34, 32 to be hot water and thus the hot water is drained from the hot water outlet 40.

In the fourth hot water heat exchanger 38, heat is transferred between the heat medium in the heat medium pipe 22, which is thermally exchanged in the second air heat exchanger 20 and the water in the cooling water pipe 42, which is supplied from the water supply device 30. Therefore, the residual heat that has not been applied in the second air heat exchanger 20 from the heat medium to the compressed air is applied to the water in the cooling water pipe 42. In other words, in the fourth hot water heat exchanger 38, the temperature of the heat medium drops and the temperature of the water rises.

The fourth hot water heat exchanger 38 is provided and thus the residual heat that has not been applied in the second air heat exchanger 20 from the heat medium to the compressed air can be effectively utilized for hot water. The water heated to high temperature in the fourth hot water heat exchanger 38 is supplied through the cooling water pipe 42 to the third hot water heat exchanger 36.

In the third hot water heat exchanger 36, heat is transferred between the oil in the second cooling pipe 28, into which heat has been recovered from the generator 44 and the water in the cooling water pipe 42, which is supplied from the fourth hot water heat exchanger 38. Therefore, the heat recovered from the generator 44 is applied to the water in the cooling water pipe 42. In other words, in the third hot water heat exchanger 36, the temperature of the oil drops and the temperature of the water rises.

The third hot water heat exchanger 36 is provided and thus in the second cooling flow passage, frictional heat generated in the generator 44 is recovered into the oil in the second cooling pipe 28. Therefore, a heat loss in the generator 44 can be reduced and heat can be effectively utilized for hot water in the system. The water heated to high temperature in the third hot water heat exchanger 36 is supplied through the cooling water pipe 42 to the second hot water heat exchanger 34.

In the second hot water heat exchanger 34, heat is transferred between the oil in the first cooling pipe 26, into which heat has been recovered from the motor 46 and the water in the cooling water pipe 42, which is supplied from the third hot water heat exchanger 36, Therefore, the heat recovered from the motor 46 is applied to the water in the cooling water pipe 42. In other words, in the second hot water heat exchanger 34, the temperature of the oil drops and the temperature of the water rises.

The second hot water heat exchanger 34 is provided and thus in the first cooling flow passage, frictional heat generated in the motor 46 is recovered into the oil in the first cooling pipe 26. Therefore, a heat loss in the motor 46 can be reduced and heat can be effectively utilized for hot water in the system. The water heated to high temperature in the second hot water heat exchanger 34 is supplied through the cooling water pipe 42 to the first hot water heat exchanger 32.

In the first hot water heat exchanger 32, heat is transferred between the compressed air heated to high temperature by compression in the casing 8c of the compressor 8 and the water supplied through the cooling water pipe 42 from the second hot water heat exchanger 34. Therefore, the heat recovered from the compressor 8 is applied to the water in the cooling water pipe 42. In other words, in the first hot water heat exchanger 32, the temperature of the compressed air drops and the temperature of the water in. the cooling water pipe 42 rises. The water heated to high temperature in the first hot water heat exchanger 32 is supplied through the cooling water pipe 42 to the hot water outlet 40.

The first hot water heat exchanger 32 is provided and thus the heat recovered from the compressed air in the compressor 8 can be utilized for hot water. Therefore, hot water can be provided without the need for additional power from the outside.

As described above, the water in the cooling water pipe 42 is sequentially heated to high temperature in the fourth to first hot water heat exchangers 38, 36, 34, 32, and therefore low-temperature heat can be also effectively utilized. In the present embodiment, the fourth hot water heat exchanger 38, the third hot water heat exchanger 36, the second hot water heat exchanger 34, and the first hot water heat exchanger 32 are arranged in the mentioned order from the upstream side to the downstream side the cooling water pipe 42. Such arrangement is based on the assumption that according to the present embodiment, in the fourth hot water heat exchanger 38, the third hot water heat exchanger 36, the second hot water heat exchanger 34, and the first hot water heat exchanger 32 in the mentioned order, heat from low to high temperature is applied to the water in the cooling water pipe 42. Therefore, the arrangement of these hot water heat exchangers 38, 36, 34, 32 may be changed in accordance with the respective heat exchange temperatures so that the water in the cooling water pipe 42 is sequentially heated to high temperature.

A pump 48b and a temperature sensor 50 are provided upstream of the hot water outlet 40 in the cooling water pipe 42. The pump 48b is controlled by a control device 52 and can regulate the amount of water flowing through the cooling water pipe 42. The temperature of water flowing through the cooling water pipe 42 is measured by the temperature sensor 50 and is output thereby to the control device 52. A flow regulating means according to the present invention includes at least the pump 48b, the temperature sensor 50, and the control device 52. The pump 48b and the temperature sensor 50 may be arranged in any positions in the cooling water flow passage without being particularly limited.

The flow rate of water in the cooling water pipe 42 can be regulated by the pump 48b; therefore, hot water can be drained at a desired temperature and at a desired flow rate from the hot water outlet 40.

Figure 3:
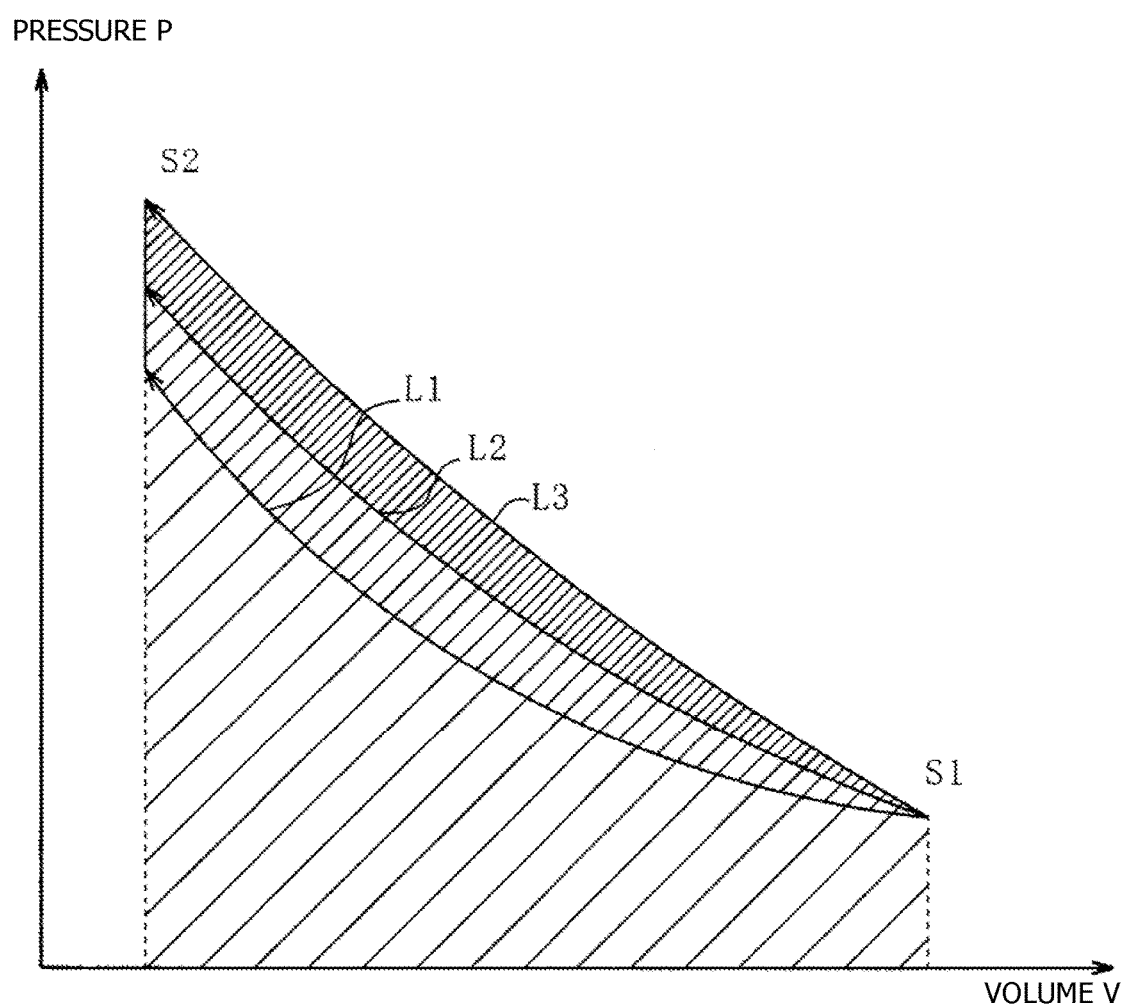
FIG. 3 is a PV diagram of the compressor according to the first embodiment of the present invention.

FIG. 3 is a PV diagram shown by degree of cooling of the compressor 8. Pressure P is plotted on the vertical axis and volume V is plotted on the horizontal axis. In the graph, compression is performed from state S1 before compression to state S2 after compression, and curves L1, L2, L3 respectively indicate that the degree of cooling is large, middle, and small. On the PV diagram, the compression work by the compressor 8 corresponds to the area indicated by a shaded area in the graph; therefore, the smaller the degree of cooling is, the larger the compression work is. In other words, the compression work is larger in the order from L3 to L1 (L3>L2>L1). As can be understood from this, air that is a working fluid is cooled, and thus. the amount of compression work of the compressor 8 can be reduced and power consumption can be reduced.

[Second Embodiment]

Figure 4:
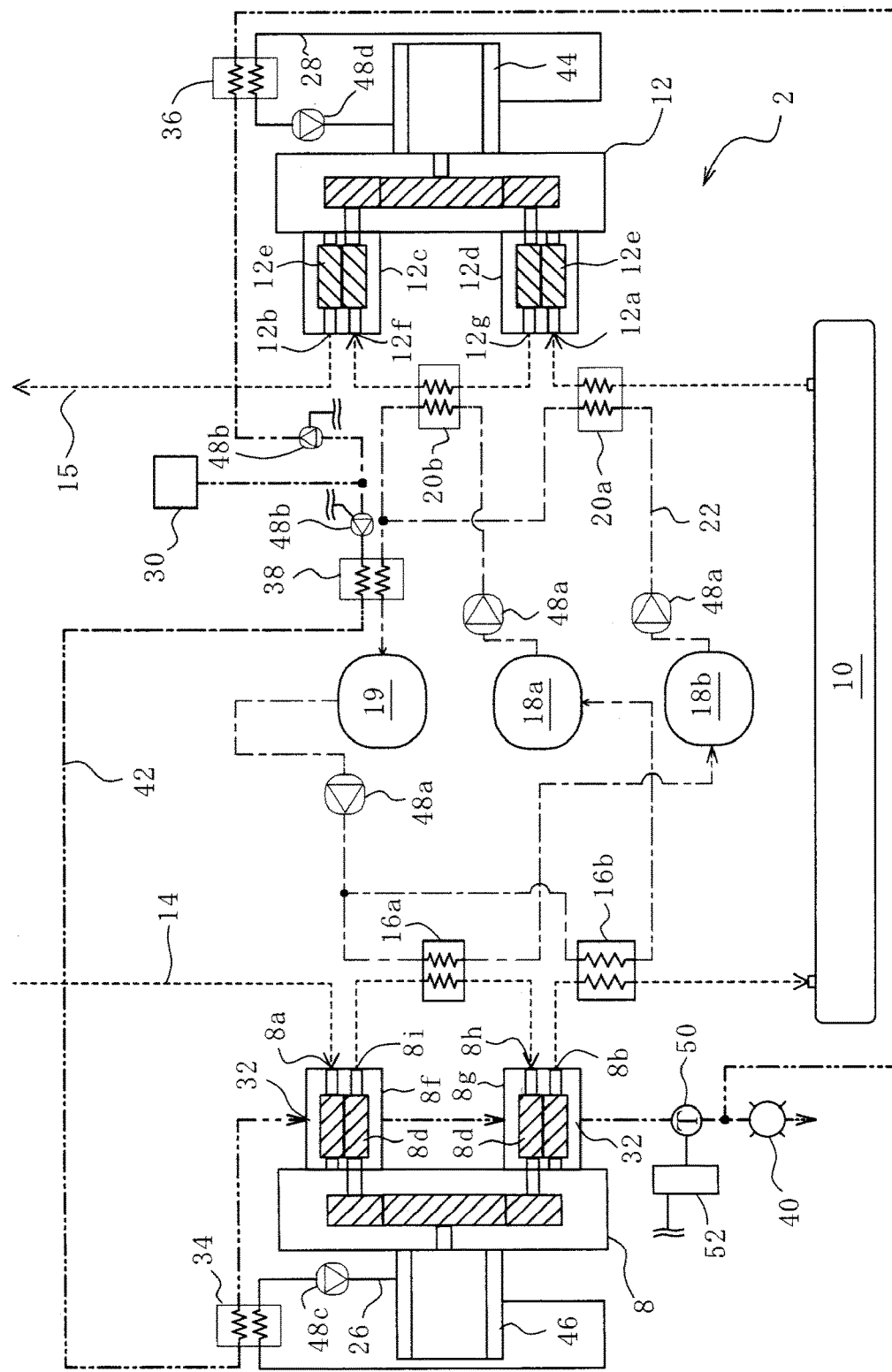
FIG. 4 is a schematic configuration diagram of the compressed air energy storage and power generation device according to a second embodiment of the present invention.

FIG. 4 is a schematic configuration diagram of the CAES power generation device 2 according to a second embodiment of the present invention. The CAES power generation device 2 according to the present embodiment is different from that of the first embodiment in that the compressor 8 is a two-stage compressor and the expander 12 is a two-stage expander and that the first heat exchanger 16 includes plural first heat exchangers, the second heat exchanger 20 includes plural second heat exchangers, and the heat storage tank 18 includes plural heat storage tanks. Other configurations of the present embodiment are substantially the same as those of the first embodiment in FIG. 1, FIG. 2A, and FIG. 2B. Therefore, the explanation of the same configurations as those shown in FIG. 1, FIG. 2A, and FIG. 2B may be omitted.

With reference to FIG. 4, the compressor 8 and the expander 12 according to the present embodiment are different from those according to the first embodiment in that the compressor 8 is a two-stage screw compressor and the expander 12 is a two-stage screw expander. Also, the heat storage tank 18 according to the present embodiment includes a high-temperature heat storage tank 18a and a low-temperature heat storage tank 18b and a heat medium is stored in the high-temperature heat storage tank 18a and the low-temperature heat storage tank 18b in accordance with the temperature of the heat medium.

The compressor 8 is a two-stage screw compressor including a low-pressure-stage compressor body 8f and a high-pressure-stage compressor body 8g. The screw compressor 8 is used and thus can promptly follow fluctuating input. Accordingly, generated power output can be promptly changed. The compressor 8 includes the motor 46. The motor 46 is mechanically connected to respective inner screws 8d of the low-pressure-stage compressor body 8f and the high-pressure-stage compressor body 8g. When input power generated by renewable energy from the power generation facility 4 is supplied to the motor 46, the motor 46 is driven by the power and the screws 8d are rotated, therefore operating the compressor 8. When the compressor 8 is driven by the motor 46, the low-pressure-stage compressor body 8f suctions air through the air pipe 14 from the suction port 8a, compresses the air, discharges the compressed air from a discharge port 8i, and then pumps the compressed air through the air pipe 14 to the high-pressure-stage compressor body 8g. The high-pressure-stage compressor body 8g suctions the air through the air pipe 14 from a suction port 8h, compresses the air, discharges the compressed air from the discharge port 8b, and then pumps the compressed air through the air pipe 14 to the pressure accumulation tank 10. Further, the single compressor 8 is provided in the present embodiment. Alternatively, a plurality of compressors 8 may be provided. Furthermore, the compressor 8 is not limited to a two-stage compressor but may be a three or more stage compressor.

The expander 12 is a two-stage screw expander including a low-pressure-stage expander body 12c and a high-pressure-stage expander body 12d. The screw expander 12 is used and thus likewise the compressor 8, the expander 12 can promptly follow fluctuating input. Accordingly, generated power output can be promptly changed. The expander 12 includes the generator 44. The generator 44 is mechanically connected to respective inner screws 12e of the low-pressure-stage expander body 12c and the high-pressure-stage expander body 12d. The high-pressure-stage expander body 12d is configured such that the suction port 12a is fluidly connected through the air pipe 15 to the pressure accumulation tank 10 and that the compressed air is supplied from the suction port 12a. The high-pressure-stage expander body 12d is operated by the compressed air supplied thereto to drive the generator 44. The high-pressure-stage expander body 12d is configured to supply the compressed air from a discharge port 12g through the air pipe 15 to a suction port 12f of the low-pressure-stage expander body 12c. The lowpressure-stage expander body 12c is likewise operated by the compressed air supplied thereto to drive the generator 44. The low-pressure-stage expander body 12c is configured to discharge the expanded air from the discharge port 12b through the air pipe 15 to the outside. Power generated in the generator 44 is supplied to an outside power system (not shown). Further, the single expander 12 is provided in the present embodiment, Alternatively, a plurality of expanders 12 may be provided. Furthermore, the expander 12 is not limited to a two-stage expander but may be a three or more stage expander.

The first air heat exchanger 16 according to the present embodiment includes an intercooler 16a and an aftercooler 16b. Heat generated in the compressor 8 is recovered into the heat medium by the intercooler 16a and the aftercooler 16b. Therefore, in the intercooler 16a and the aftercooler 16b, the temperature of the compressed air drops and the temperature of the heat medium rises.

In the air flow passage, the intercooler 16a is provided in the air pipe 14 extending from the low-pressure-stage compressor body 81 to the high-pressure-stage compressor body 8g. Also, in the heat medium flow passage, the intercooler 16a is provided in the heat medium pipe 22 extending from the heat medium return tank 19 to the low-temperature heat storage tank 18b. Therefore, the intercooler 16a allows heat exchange between the compressed air that has been compressed in the low-pressure-stage compressor body 8f and the heat medium to be supplied to the low-temperature heat storage tank 18b; thereby, compression heat generated in the low-pressure-stage compressor body 8f is recovered into the heat medium. The heat medium heated here to high temperature is supplied through the heat medium pipe 22 to the low-temperature heat storage tank 18b.

In the air flow passage, the aftercooler 16b is provided in the air pipe 14 extending from the high-pressure-stage compressor body 8g to the pressure accumulation tank 10. Also, in the heat medium flow passage, the aftercooler 16b is provided in the heat medium pipe 22 extending from the heat medium return tank 19 to the high-temperature heat storage tank 18a. Therefore, the aftercooler 16b allows heat exchange between the compressed air that has been compressed in the high-pressure-stage compressor body 8g and the heat medium to be supplied to the high-temperature heat storage tank 18a; thereby; compression heat generated in the low-pressure-stage compressor body 8f and the high-pressure-stage compressor body 8g is recovered into the heat medium. The heat medium heated to high temperature in the aftercooler 16b is supplied through the heat medium pipe 22 to the high-temperature heat storage tank 18a.

Thus, the high-temperature heat medium can be stored in the high-temperature heat storage tank 18a, and the heat medium at temperature lower than the high-temperature heat medium can be stored in the low-temperature heat storage tank 18b. In other words, the heat medium can be stored in accordance with the temperature thereof, and thus the compressed air flowing into the two-stage expander 12 can be effectively heated by the heat medium stored at high and low temperatures. Consequently, charge and discharge efficiency can be maintained at high level.

The second air heat exchanger 20 according to the present embodiment includes a preheater 20a and an interheater 20b. Before being expanded in the expander 12, the compressed air is heated by the preheater 20a and the interheater 20b. Therefore, in the preheater 20a and the interheater 20b, the temperature of the compressed air rises and the temperature of the heat medium drops.

In the air flow passage, the preheater 20a is provided in the air pipe extending from the pressure accumulation tank 10 to the high-pressure-stage expander body 12d. Also, in the heat medium flow passage, the preheater 20a is provided in the heat medium pipe 22 extending from the low-temperature heat storage tank 18b to the heat medium return tank 19. Therefore, the preheater 20a allows heat exchange between the compressed air before being expanded in the high-pressure-stage expander body 12d and the heat medium supplied from the low-temperature heat storage tank 18b; thereby, the compressed air is heated before being expanded in the high-pressure-stage expander body 12d. The heat medium cooled to low temperature in the preheater 20a is supplied through the heat medium pipe 22 to the heat medium return tank 19.

In the air flow passage, the interheater 20b is provided in the air pipe 15 extending from the high-pressure-stage expander body 12d to the low-pressure-stage expander body 12c. Also, in the heat medium flow passage, the interheater 20b is provided in the heat medium pipe 22 extending from the high-temperature heat storage tank 18a to the heat medium return tank 19. Therefore, the interheater 20b allows heat exchange between the compressed air before being expanded in the low-pressure-stage expander body 12c and the heat medium supplied from the high-temperature heat storage tank 18a; thereby, the compressed air is heated before being expanded in the low-pressure-stage expander body 12c. The heat medium cooled to low temperature in the interheater 20b is supplied through the heat medium pipe 22 to the heat medium return tank 19.

The heat medium return tank 19 is configured to store the heat medium cooled to low temperature by heat exchange in the second air heat exchanger 20 (the preheater 20a and the interheater 20b). The heat medium stored in the heat medium return tank 19 is supplied through the heat medium pipe 22 to the first air heat exchanger 16 (the intercooler 16a and the aftercooler 16b).

In the present embodiment, the cooling water flow passage is configured by the cooling water pipe 42 in the same way as in the first embodiment. One end of the cooling water flow passage is fluidly connected to the water supply device 30 and. the other end of the cooling water flow passage is fluidly connected to the hot water outlet 40. The first to fourth hot water heat exchangers 32, 34, 36, 38 are arranged in the same way as in the first embodiment; however, only the configuration of the first hot water heat exchanger 32 is different from that of the first embodiment.

The first hot water heat exchanger 32 of the present embodiment is different from that of the first embodiment in that water in the cooling water pipe 42 is heated in two stages. Specifically, the first hot water heat exchanger 32 is configured to heat the water in the cooling water pipe 42 by compression heat generated in the low-pressure-stage compressor body 8f and the high-pressure-stage compressor body 8g. Therefore, in the first hot water heat exchanger 32, the temperature of the compressed air drops and the temperature of the water in the cooling water pipe 42 rises.

In the low-pressure-stage compressor body 8f, a portion of the cooling water pipe 42 extending from the second hot water heat exchanger 34 to the high-pressure-stage compressor body 8g in the cooling water flow passage is provided in the casing 8c of the low-pressure-stage compressor body 8f so as to surround the screw 8d in the same way as in the first embodiment. Accordingly, heat is transferred between the water in the cooling water pipe 42 and the compressed air in the casing 8c of the low-pressure-stage compressor body 8f. Therefore, heat generated in the low-pressure-stage compressor body 8f is applied to the water in the cooling water pipe 42.

In the high-pressure-stage compressor body 8g, a portion of the cooling water pipe 42 extending from the low-pressure-stage compressor body 8f to the hot water outlet 40 is provided in the casing 8c of the high-pressure-stage compressor body 8g so as to surround the screw 8d in the same way as in the first embodiment. Accordingly, heat is transferred between the water in the cooling water pipe 42 and the compressed air in the casing 8c of the high-pressure-stage compressor body 8g. Therefore, heat generated in the high-pressure-stage compressor body 8g is applied to the water in the cooling water pipe 42.

As described above, compression heat recovered from the compressed air of the low-pressure-stage compressor body 8f and the high-pressure-stage compressor body 8g can be effectively utilized to turn the water in the cooling water pipe 42 into hot water. Particularly, in the case of the two-stage compressor 8 as in the present embodiment, the temperature of the compressed air in the high-pressure-stage compressor body 8g is usually higher than the temperature of the compressed air in the low-pressure-stage compressor body 8f. Thus, the low-pressure-stage compressor body 8f is provided upstream of the high-pressure-stage compressor body 8g in the cooling water flow passage; thereby, the water in the cooling water pipe 42 can be sequentially heated to high temperature and the heat of the low-pressure-stage compressor body 8f and the heat of the high-pressure-stage compressor body 8g can be effectively utilized.

Figure 5:
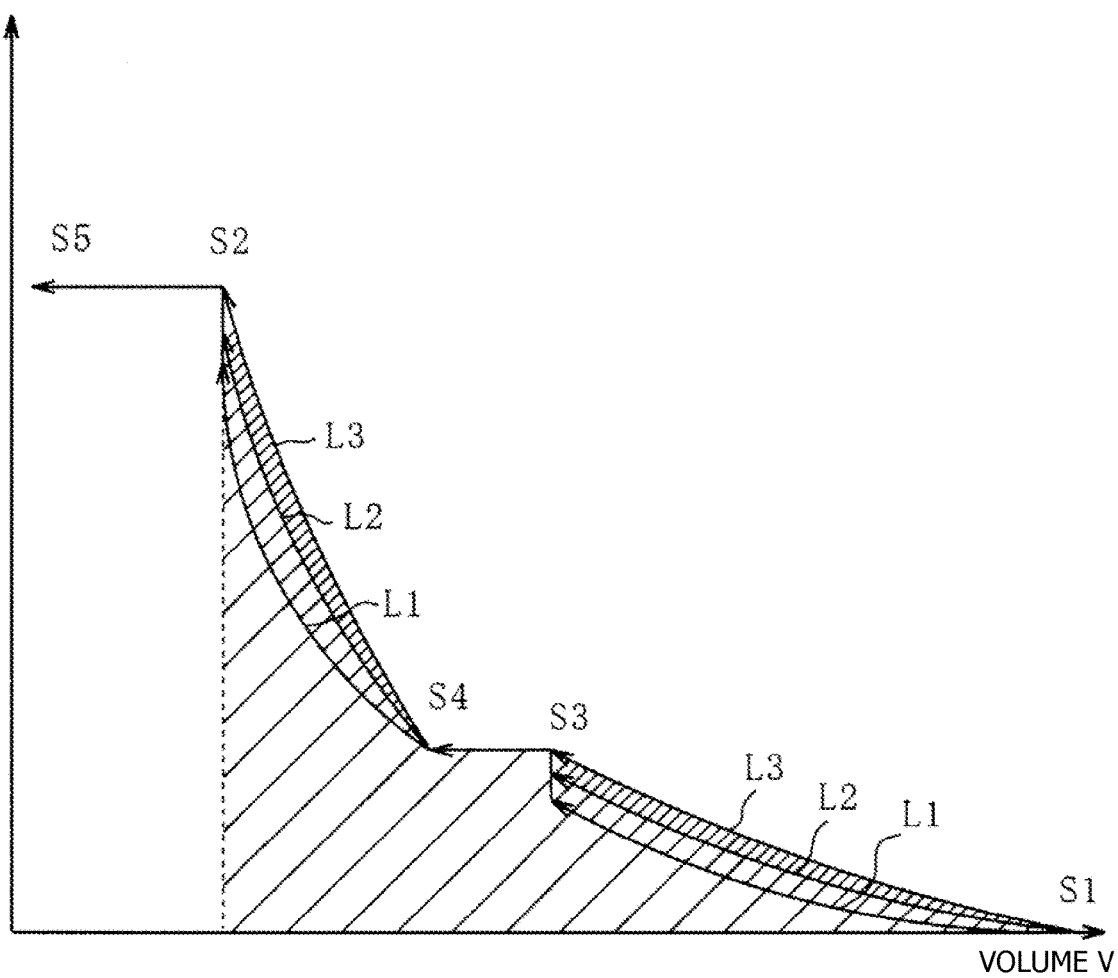
FIG. 5 is a PV diagram of the compressor according to the second embodiment of the present invention.

FIG. 5 is a PV diagram shown by degree of cooling of the two-stage compressor 8. Pressure P is plotted on the vertical axis and volume V is plotted on the horizontal axis. In the graph, compression is performed from state S1 before first-stage compression to state S3 after first-stage compression, and curves L1, L2, L3 respectively indicate that the degree of cooling is large, middle, and small. Further, before second-stage compression, from state S3 to state S4, the compressed air is cooled in the intercooler 16a. Furthermore, from state S4 before second-stage compression to state S2 after second-stage compression, compression is performed. Likewise, curves L1, L2, L3 respectively indicate that the degree of cooling is large, middle, and small. In addition, from state S2 after second-stage compression to state S5, the compressed air is cooled in the aftercooler 16b. On the PV diagram, the compression work by the compressor 8 corresponds to the area indicated by a shaded area in the graph; therefore, the smaller the degree of cooling is, the larger the compression work is. In other words, the compression work is larger in the order from L3 to L1 (L3>L2>L1). Charge and discharge effectiveness of the system is increased. As can be understood from this, in the two-stage compressor 8, air that is a working fluid is cooled; therefore, the amount of compression work of the two-stage compressor 8 can be reduced and power consumption can be reduced.

Throughout the embodiments, "fluctuating input power" of the present invention is not only related to renewable energy but may be related to smoothing or peak shaving of demand power in plant facilities.

Also, water such as tap water, water for industrial use, or water of reservoirs or rivers can be utilized as the cooling water of the present invention, but not limited thereto. Alternatively, water including antirust agent or antifreeze solution can be utilized.

In the foregoing embodiments, the cooling water flow passage is configured by the cooling water pipe 42, and one end of the cooling water flow passage is fluidly connected to the water supply device 30 while the other end of the cooling water flow passage is fluidly connected to the hot water outlet 40, Therefore, if the cooling water is used as hot water in another site, hot water drained from the hot water outlet mechanism (hot water outlet) 40 may be pumped out to the site. On the other hand, if the cooling water is not used as hot water in another site, a cooling tower is provided as the water supply device 30 and thereby hot water drained from the hot water outlet mechanism (hot water outlet) 40 may be circulated back to the cooling tower. Also, hot water drained from the hot water outlet mechanism (hot water outlet) 40 may be disposed to the outside.

EXPLANATION OF REFERENCE NUMERALS

2 Compressed air energy storage and power generation device (CAES power generation device)
4 Power generation facility
6 Power system (supply destination)
8 Compressor
8a, 8h Suction port
8b, 8i Discharge port
8c Casing
8d Rotor (screw)
8e Bearing
8f Low-pressure-stage compressor body
8g High-pressure-stage compressor body
10 Pressure accumulation tank
12 Expander
12a, 12f Suction port
12b, 12g Discharge port
12c Low-pressure-stage expansion body
12d High-pressure-stage expansion body
12e Rotor (screw)
14, 15 Air pipe
16 First air heat exchanger (fourth heat exchanger)
16a Intercooler
16b Aftercooler
18 Heat storage tank
18a High-temperature heat storage tank
18b Low-temperature heat storage tank
19 Heat medium return tank
20 Second air heat exchanger (fifth heat exchanger)
20a Preheater
20b Interheater
22 Heat medium pipe
26 First cooling pipe
28 Second cooling pipe
30 Water supply device
32 First hot water heat exchanger (first heat exchanger)
34 Second hot water heat exchanger (second heat exchanger)
36 Third hot water heat exchanger (third heat exchanger)
38 Fourth hot water heat exchanger (sixth heat exchanger)
40 Hot water outlet mechanism (hot water outlet)
42 Cooling water pipe
44 Generator
46 Motor
48a, 48b, 46c, 48d Pump (flow regulating means)
50 Temperature sensor (flow regulating means)
52 Control device (flow regulating means)

The invention claimed is:
1. A compressed air energy storage and power generation device, comprising:
an electric motor configured to be driven by fluctuating input power;

a compressor configured to be mechanically connected to the electric motor and to compress air;

a pressure accumulation tank configured to be fluidly connected to the compressor and to store the air compressed by the compressor;

an expander configured to be fluidly connected to the pressure accumulation tank and to be driven by the compressed air supplied from the pressure accumulation tank;

a generator configured to be mechanically connected to the expander;

a cooling water flow passage to which cooling water is supplied;

a first heat exchanger provided with a portion of the cooling water flow passage, which is located in a casing of the compressor, the first heat exchanger being configured to perform heat exchange to heat the cooling water in the cooling water flow passage to high temperature and cool the air as a working fluid to low temperature;

a first cooling flow passage through which a first cooling fluid for cooling the electric motor flows; and a second heat exchanger configured to perform heat exchange between the first cooling fluid heated to high temperature in the first cooling flow passage and the cooling water in the cooling water flow passage to heat the water in the cooling water flow passage to high temperature.

2. The compressed air energy storage and power generation device according to claim 1, further comprising a hot water outlet mechanism from which the cooling water heated to high temperature in the cooling water flow passage is drained as hot water.

3. A compressed air energy storage and power generation device, comprising:

an electric motor configured to be driven by fluctuating input power;

a compressor configured to be mechanically connected to the electric motor and to compress air;

a pressure accumulation tank configured to be fluidly connected to the compressor and to store the air compressed by the compressor;

an expander configured to be fluidly connected to the pressure accumulation tank and to be driven by the compressed air supplied from the pressure accumulation tank;

a generator configured to be mechanically connected to the expander;

a cooling water flow passage to which cooling water is supplied;

a first heat exchanger provided with a portion of the cooling water flow passage, which is located in a casing of the compressor, the first heat exchanger being configured to perform heat exchange to heat the cooling water in the cooling water flow passage to high temperature and cool the air as a working fluid to low temperature;

a second cooling flow passage through which a second cooling fluid for cooling the generator flows; and a third heat exchanger configured to perform heat exchange between the second cooling fluid heated to high temperature in the second cooling flow passage and the cooling water in the cooling water flow passage to heat the water in the cooling water flow passage to high temperature.

4. The compressed air energy storage and power generation device according to claim 2, further comprising:

a fourth heat exchanger configured to perform heat exchange between the compressed air compressed in the compressor and a heat medium to heat the heat medium to high temperature;

a heat storage tank configured to store the heat medium heated to high temperature in the fourth heat exchanger; and a fifth heat exchanger configured to perform heat exchange between the heat medium supplied from the heat storage tank and the compressed air supplied from the pressure accumulation tank, heat the compressed air to high temperature, and supply the heated compressed air to the expander.

5. The compressed air energy storage and power generation device according to claim 4, further comprising a sixth heat exchanger configured to perform heat exchange between the heat medium after heat exchange in the fifth heat exchanger and the cooling water in the cooling water flow passage to heat the water in the cooling water flow passage to high temperature.

6. The compressed air energy storage and power generation device according to claim 1, further comprising:

a second cooling flow passage through which a second cooling fluid for cooling the generator flows; and a third heat exchanger configured to perform heat exchange between the second cooling fluid heated to high temperature in the second cooling flow passage and the water in the cooling water flow passage to heat the water in the cooling water flow passage to high temperature.

7. The compressed air energy storage and power generation device according to claim 6, further comprising:

a fourth heat exchanger configured to perform heat exchange between the compressed air compressed in the compressor and a heat medium to heat the heat medium to high temperature;

a heat storage tank configured to store the heat medium heated to high temperature in the fourth heat exchanger; and a fifth heat exchanger configured to perform heat exchange between the heat medium supplied from the heat storage tank and the compressed air supplied from the pressure accumulation tank, heat the compressed air to high temperature, and supply the heated compressed air to the expander.

8. The compressed air energy storage and power generation device according to claim 7, further comprising a sixth heat exchanger configured to perform heat exchange between the heat medium after heat exchange in the fifth heat exchanger and the water in the cooling water flow passage to heat the water in the cooling water flow passage to high temperature.

9. The compressed air energy storage and power generation device according to claim 8, wherein the first heat exchanger, the second heat exchanger, the third heat exchanger, and the sixth heat exchanger are configured to be fluidly connected in series to sequentially heat the water in the cooling water flow passage to high temperature.

10. The compressed air energy storage and power generation device according to claim 2, comprising a flow regulating means configured to regulate the flow rate of the water flowing through the cooling water flow passage, wherein the flow rate and the temperature of the water drained from the hot water outlet mechanism are regulated by the flow regulating means.

11. The compressed air energy storage and power generation device according to claim 1, further comprising:

a fourth heat exchanger configured to perform heat exchange between the compressed air compressed in the compressor and a heat medium to heat the heat medium to high temperature;

a heat storage tank configured to store the heat medium heated to high temperature in the fourth heat exchanger; and a fifth heat exchanger configured to perform heat exchange between the heat medium supplied from the heat storage tank and the compressed air supplied from the pressure accumulation tank, heat the compressed air to high temperature, and supply the heated compressed air to the expander.

12. The compressed air energy storage and power generation device according to claim 3, further comprising:

a fourth heat exchanger configured to perform heat exchange between the compressed air compressed in the compressor and a heat medium to heat the heat medium to high temperature;

a heat storage tank configured to store the heat medium heated to high temperature in the fourth heat exchanger; and a fifth heat exchanger configured to perform heat exchange between the heat medium supplied from the heat storage tank and the compressed air supplied from the pressure accumulation tank, heat the compressed air to high temperature, and supply the heated compressed air to the expander.

13. The compressed air energy storage and power generation device according to claim 1, comprising a flow regulating means configured to regulate the flow rate of the water flowing through the cooling water flow passage, wherein the flow rate and the temperature of the water drained from the hot water outlet mechanism are regulated by the flow regulating means.

* * * * *